United States Patent
Merkner et al.

[15] 3,653,525
[45] Apr. 4, 1972

[54] CONTAINER UNLOADING AND TRANSFERING APPARATUS

[72] Inventors: Albert H. Merkner; Alessandro Viecili, both of Pittsburgh, Pa.; Robert C. McCoy, deceased, late of Pittsburgh, Pa. by Betty May Corneil McCoy, legal representative

[73] Assignee: H. J. Heinz Company, Pittsburgh, Pa. by said Merkner and said Viecili

[22] Filed: Jan. 30, 1970

[21] Appl. No.: 7,149

[52] U.S. Cl. ...................... 214/309, 198/32, 214/8.5 A, 214/8.5 D
[51] Int. Cl. ................................................. B65g 59/02
[58] Field of Search ............... 214/8.5 R, 8.5 A, 8.5 C, 8.5 D, 214/309; 198/32

[56] References Cited

UNITED STATES PATENTS

| | | | |
|---|---|---|---|
| 3,342,349 | 9/1967 | Sheldon | 214/8.5 C |
| 2,615,746 | 10/1952 | Fischer | 294/65.5 |
| 3,534,872 | 10/1970 | Roth | 214/8.5 C |

Primary Examiner—Gerald M. Forlenza
Assistant Examiner—George F. Abraham
Attorney—Parmelee, Utzler & Welsh

[57] ABSTRACT

The apparatus disclosed is particularly, but not exclusively, applicable for removing hot filled tins from a sterilizing basket where they are arranged in multiple layers or tiers on a vertically-movable bottom panel by raising the bottom panel in increments such that the cans of each layer in turn are pushed against a magnetic head and the basket then lowered sufficiently to leave the uppermost layer of cans suspended from the magnetic head. Said head then moves the layer of cans as a group laterally and drops them onto an endless conveyor, each layer in the basket being successively removed in this way. The conveyor carries the cans between parallel divider strips that arrange them in a plurality of lanes. Gate means are provided for simultaneously discharging the lead can in each lane onto a cross conveyor at the discharge end of the first conveyor, and when a can from each lane is positioned on the cross conveyor, the row of cans is carried single file from the ends of the lanes for transfer to a transport conveyor that takes them to a labeling machine or other apparatus to which they are to be delivered in single file. As each row of cans is carried away from the discharge end of the first conveyor, the magnet head will repeat its cycle to deposit another layer of cans, the operation continuing until all of the layers in the basket have been thus unloaded.

21 Claims, 16 Drawing Figures

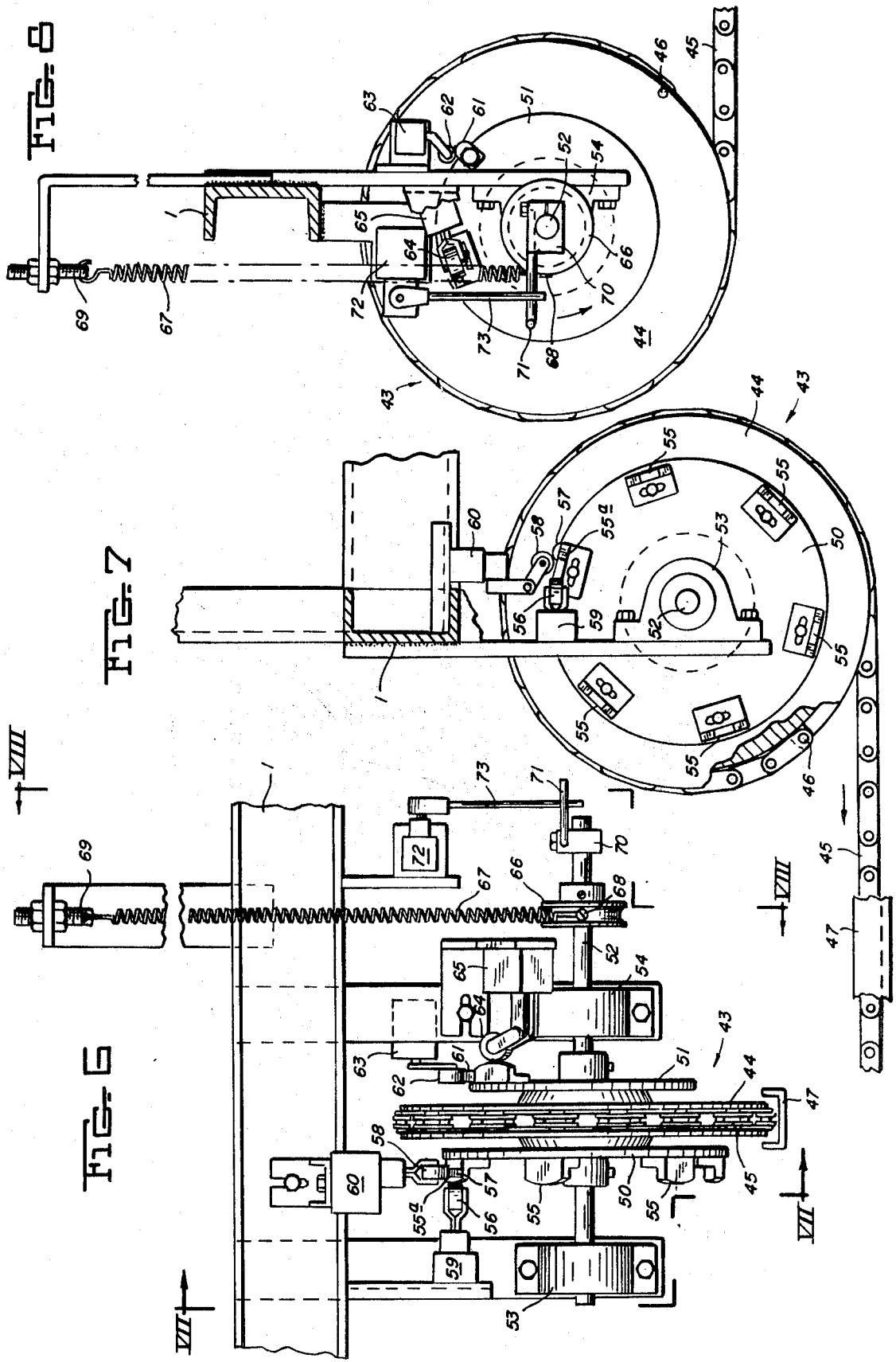

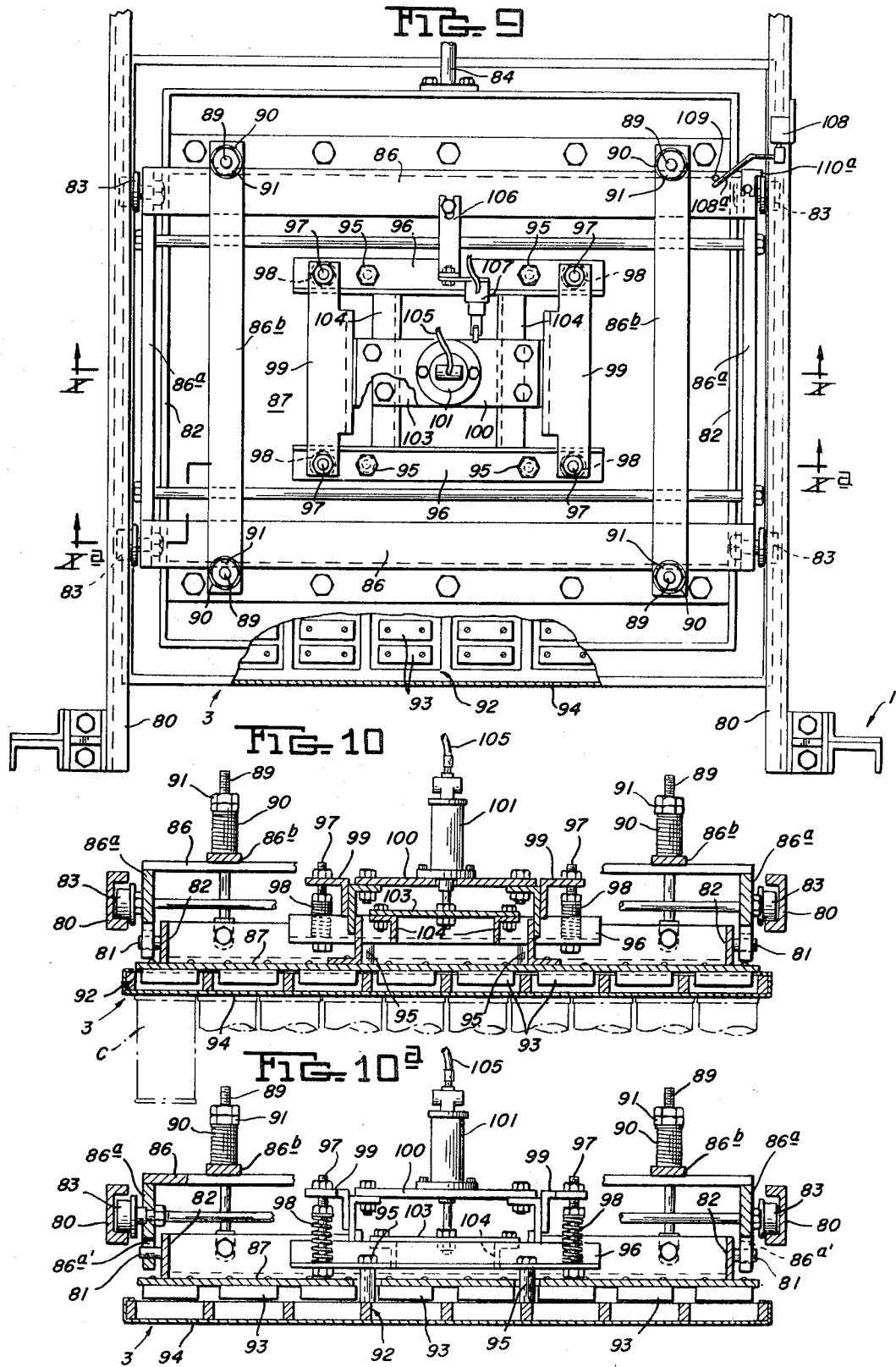

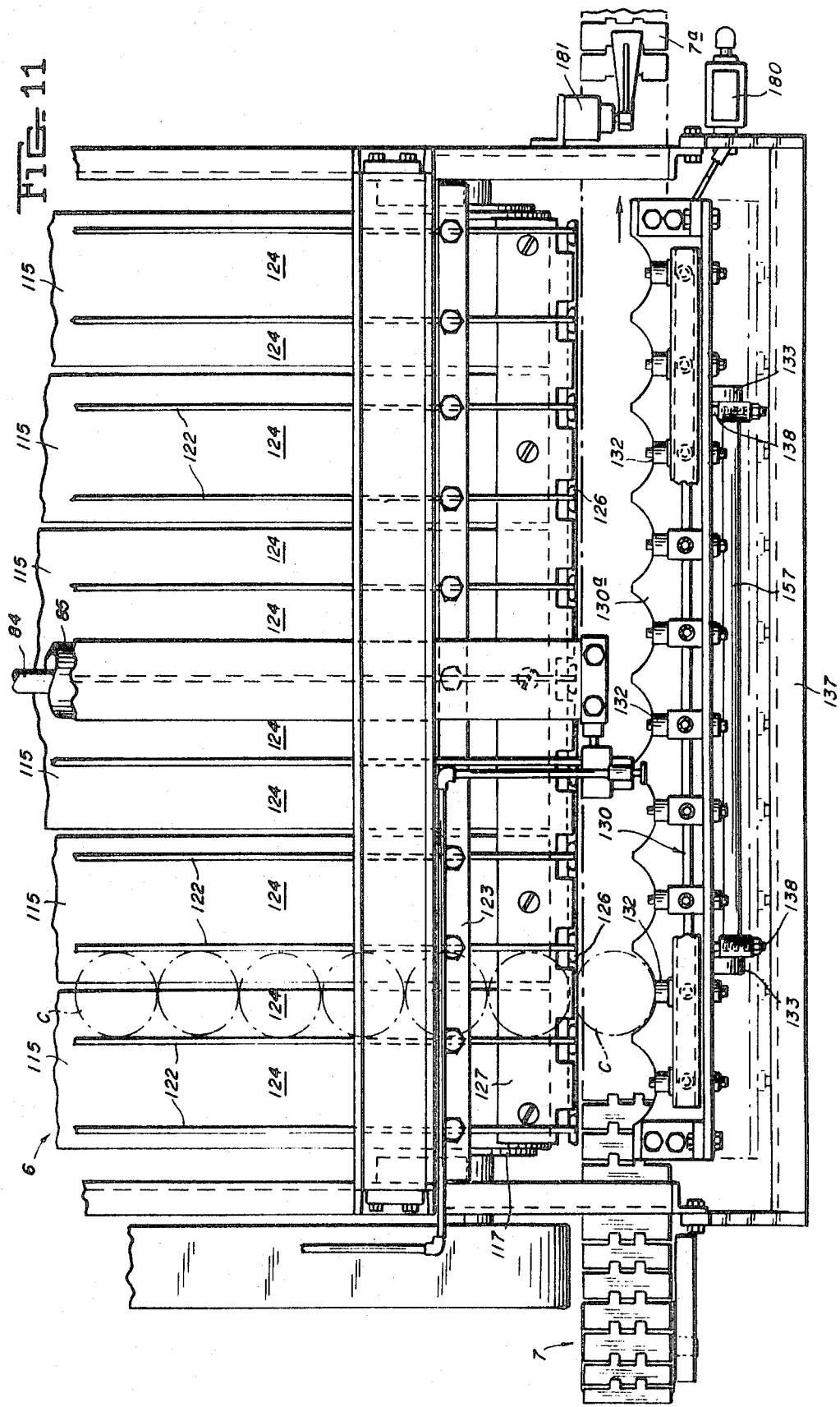

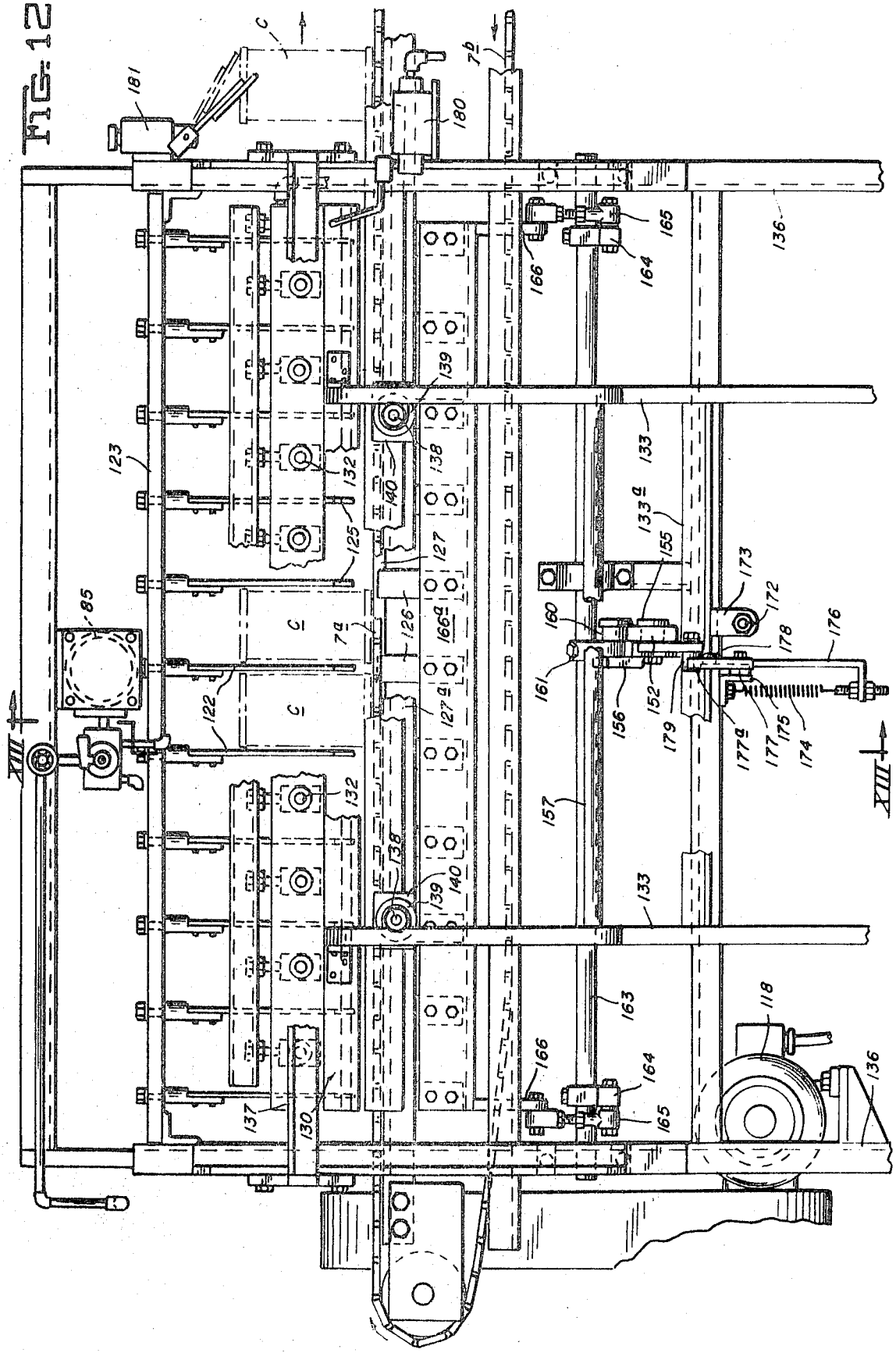

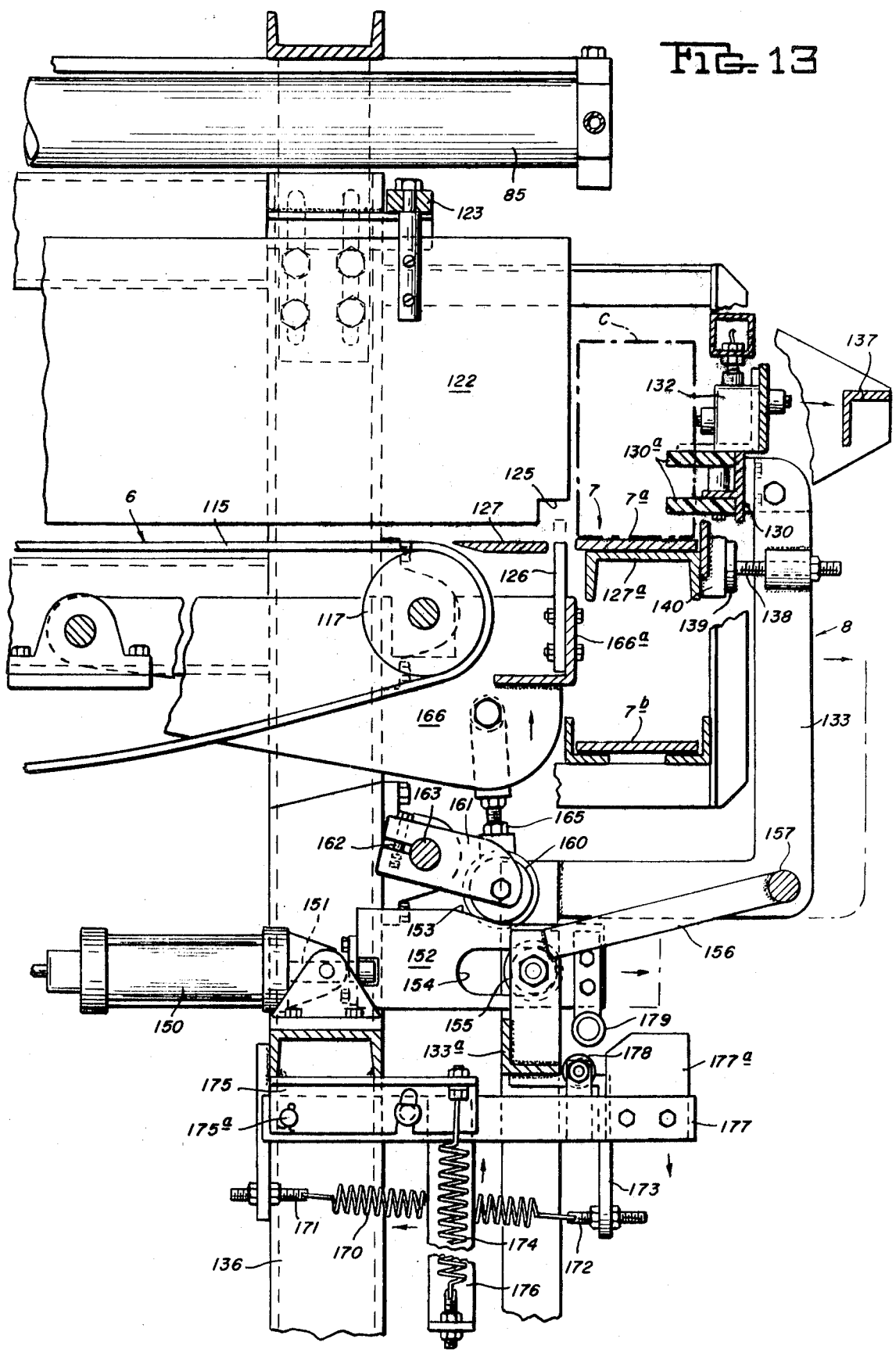

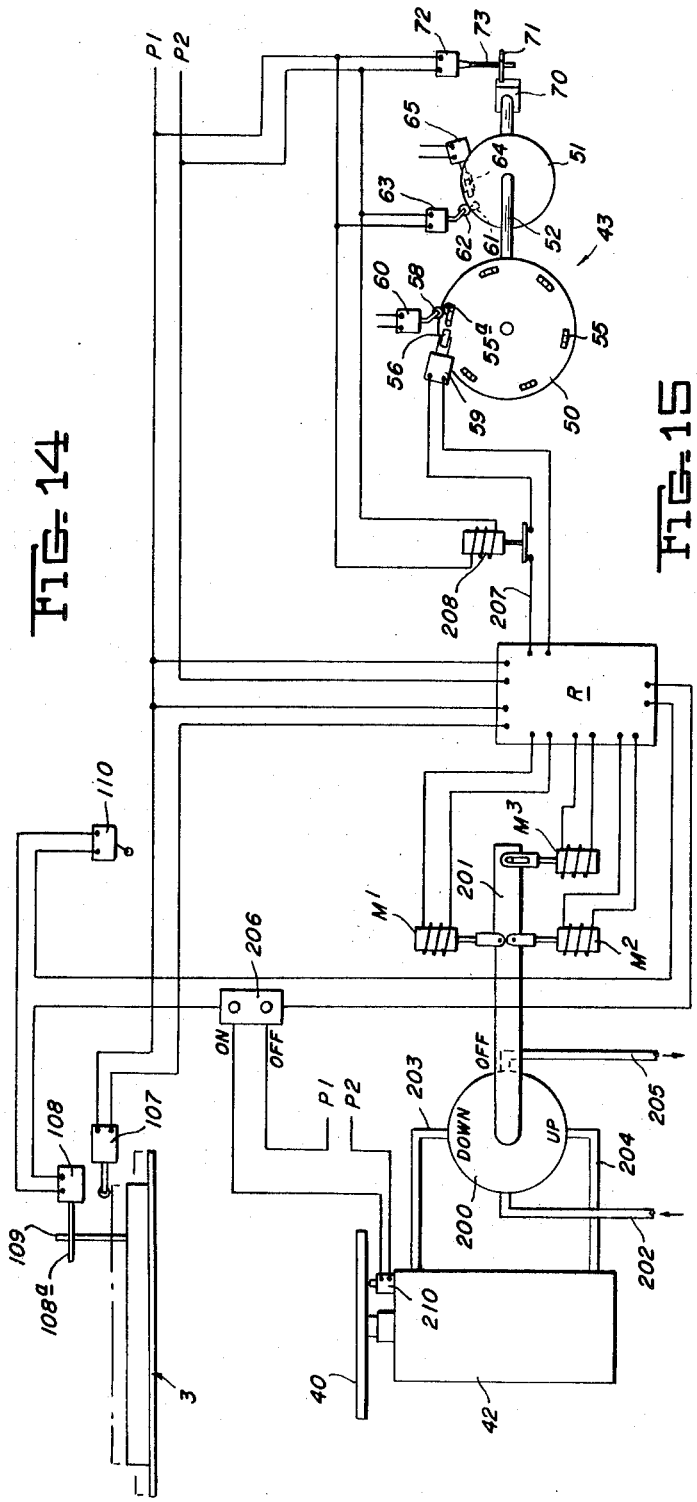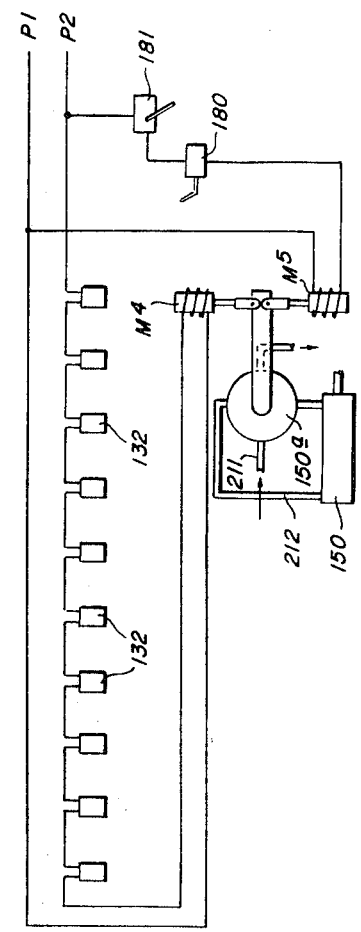

CONTAINER UNLOADING AND TRANSFERING APPARATUS

FIELD OF THE INVENTION

This invention is for an unloader for removing tin cans or other magnetic articles of uniform size, as for example hollow steel shells or cup-like bodies such as engine pistons or other parts of machines or articles, including solid bodies, which are stacked in layers in baskets or like receptacles or on pallets or like supporting panels and delivering them in single file to some further precessing or packing operation. The invention is particularly useful for removal of hot-filled tin cans from the basket in which they have been sterilized in a retort and arranging them for transportation in single file to a labeling machine, and will hereinafter be specifically described for this purpose, but without limitation as to the use to which it may be put.

BACKGROUND OF THE INVENTION

After food products or other perishable preparations are filled into tin cans (which are in fact formed of sheet steel having a tin coating) and the cans or tins are hermetically sealed, they are commonly stacked in so-called sterilizing baskets in several horizontal layers or tiers, usually with a separating sheet between layers, each basket holding a large number of tins so arranged. Several of these baskets, which are in fact square or rectangular metal crates with a separate metal bottom panel that can move up and down inside the four side walls, after being loaded, are placed in a retort where they are held in an atmosphere of steam under pressure, for a sustained period of time until the heat has thoroughly penetrated the contents of the can and sterilized them, the temperature commonly being of the order of 250° F. The cans must then be removed from the baskets, after which they are inspected and labeled. Economy of production, limited floor space and full time use of equipment does not ordinarily permit retention of the cans in the baskets until they are cool enough to be comfortably handled. Unloading them from the baskets is difficult and exhausting labor, and procedures for unloading involving dumping or other rough handling of the filed cans cannot be used, lest the cans be dented or bent or otherwise damaged.

SUMMARY OF THE PRESENT INVENTION

The present invention provides an apparatus to which the filled baskets are successively delivered. Each in turn moves to an unloading position, its contents removed, the empty basket moved aside and the next is moved to unloading position.

When a basket moves to unloading position, an elevator pushes upwardly on the loose bottom panel of the basket raising all of the contents up until the uppermost layer of cans presses against a magnetic unloading or transfer head to which the cans of the top layer then magnetically adhere while a control mechanism lowers the remaining cans a slight distance, leaving the top layer of cans suspended from the magnetic head clear of the sides of the basket. The unloading head then moves laterally to a position over a receiving conveyor onto which the entire group of cans constituting one layer is deposited. The magnetic head then returns to the unloading position whereupon the elevator again operates to press the then uppermost layer of cans against the magnet head, which likewise deposits them on the receiving conveyor, and the cycle is repeated until each layer in turn has been transferred to the receiving conveyor. Sensing means, such as an electric eye system, times the cycle of operation so as to prevent an unmanageable accumulation of cans on the receiving conveyor.

The receiving conveyor carries the cans as they are deposited toward its discharge end, and parallel spaced divider plates over the receiving conveyor arrange the cans in parallel lanes between these plates. At the discharge end of the receiving conveyor there is a narrow cross conveyor. A gating mechanism is arranged to allow the leading can in each lane to move onto the cross conveyor, forming a single row of cans on the cross conveyor with the number of cans in the row corresponding to the number of lanes. When such a row is complete, the cross conveyor operates to carry them to some take-away conveyor onto which they are delivered in single file for transportation to the labeling machine. As soon as one such row of cans is clear of the discharge end of the receiving conveyor, the gate mechanism operates to again allow the leading can in each lane to move onto the cross conveyor, and the operation keeps repeating as long as there is a supply of cans.

In the apparatus just described, the cans are in baskets or containers having movable bottom panels, but in some operations cans or other articles with which the apparatus may be used may be on pallets or other supporting panels without confining side walls, and in this case of course the entire pallet or supporting panel is raised in successive increments to present the then uppermost layer to the magnetic transfer head.

BRIEF DESCRIPTION OF THE DRAWINGS

In the drawings, wherein like parts are marked alike:

FIG. 6 is a fragmentary front elevation of a control mechanism including the raising of the multi-layer load in increments;

FIG. 7 is a sectional view taken along lines VII—VII of FIG. 6;

FIG. 8 is a sectional view taken along lines VIII—VIII of FIG. 6;

FIG. 9 is a top plan view of the reciprocating magnetic unloading head used to transfer a layer of cans from the basket to the receiving conveyor;

FIG. 10 is a front elevation of the magnetic unloading head taken along lines X—X of FIG. 9, with cans adhered thereto, but with a portion broken away to show certain parts in section;

FIG. 10a is a front elevational view taken along the plane of lines Xa—Xa of FIG. 9 showing the position of the cover plate when cans are deposited on the receiving conveyor from the magnetic head;

FIG. 11 is a fragmentary plan view of the discharge end of the receiving conveyor with the cross conveyor showing the position of the rocker bar assembly comprising part of the gate mechanism by which a single row of cans is lined up on the cross conveyor, the view being on a larger scale than FIG. 3;

FIG. 12 is a rear elevation of FIG. 11 and adjacent parts of the machine, a portion being broken away;

FIG. 13 is a sectional view taken along the plane of lines XIII—XIII of FIG. 12;

FIG. 14 is a schematic wiring diagram for the control of the elevator; and

FIG. 15 is a schematic wiring diagram for the rocker bar and gating mechanism.

DETAILED DESCRIPTION

Figure 1:
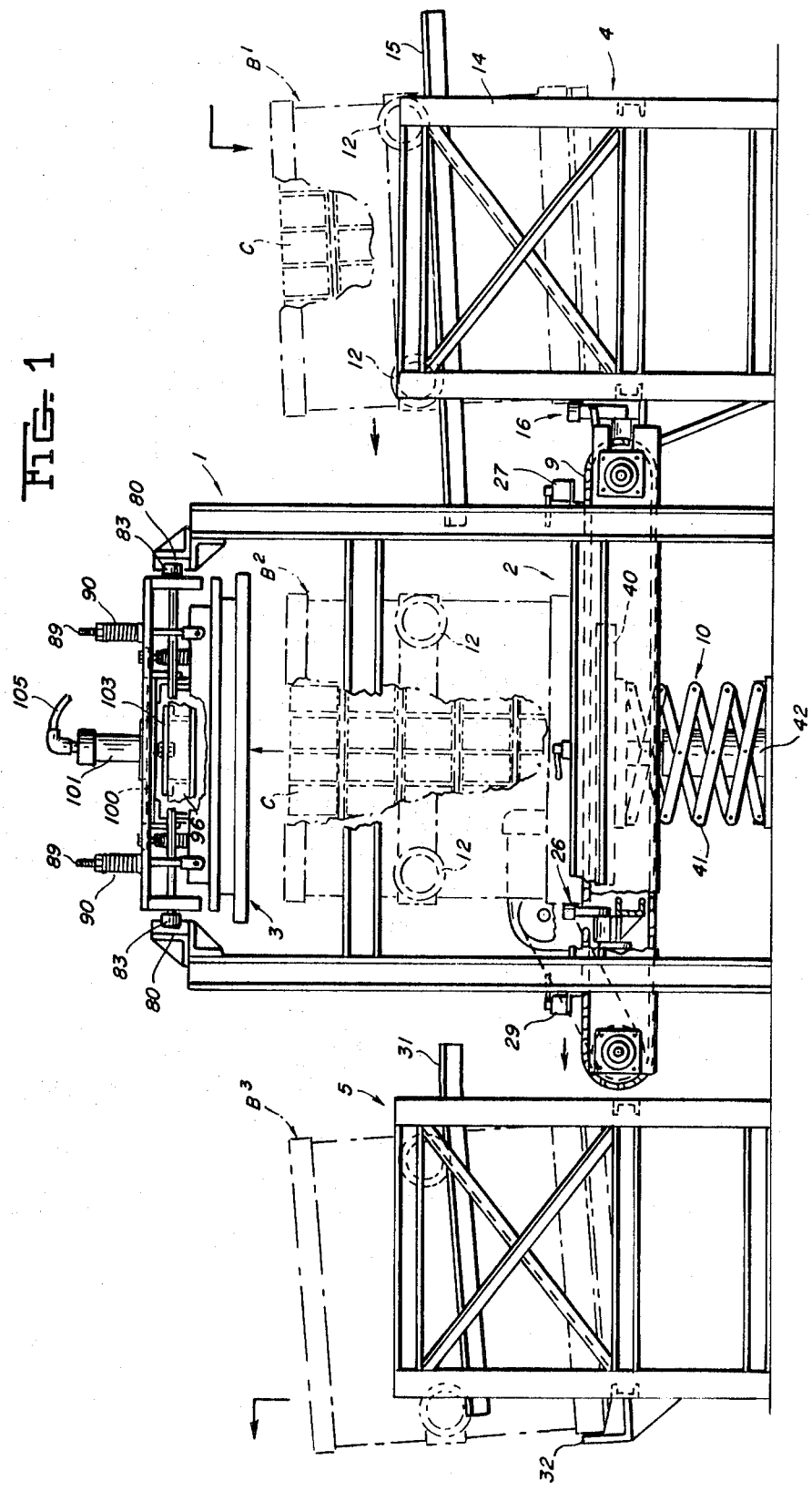
FIG. 1 is a front elevation of an apparatus embodying the invention, only the parts at the front being shown.

Referring to the drawings, wherein like numerals designate like parts throughout, the preferred embodiment of the invention has a supporting frame 1 at the front of which is a basket-positioning means designated generally as 2. There is a reciprocal magnetic load transferring head 3 above the basket-positioning means. At one side of the basket-positioning means is a loaded basket-receiving structure designated generally as 4, and at the other side is an unloaded basket-receiving support designated generally as 5.

The magnetic unloading head is movable horizontally from over the basket-positioning means to a position over an endless can-receiving conveyor 6. There is a cross conveyor 7 at the rear or discharge end of the receiving conveyor and a rocker bar and gating mechanism, designated generally as 8.

The baskets, indicated in broken lines at $B^1$, $B^2$ and $B^3$ have the containers or cans $c$ stacked therein in layers, with the cans arranged in several parallel rows, the number of layers and the number of cans in each layer depending on the size of the can. Usually the machine is set up for a more or less continuous run on one size of can. As an example, a typical arrangement here shown is five layers of cans, with eight rows of ten cans each constituting a load. The baskets, as heretofore explained, are crate-like open top metal boxes such, for example, as shown in application Ser. No. 733,909 filed June 3, 1963, now U.S. Pat. No. 3,532,049, issued Oct. 6, 1970, and assigned to our assignee. The baskets have a rigid strip along each side intermediate the top and bottom, each strip having two flanged wheels 12 thereon.

Figure 3:
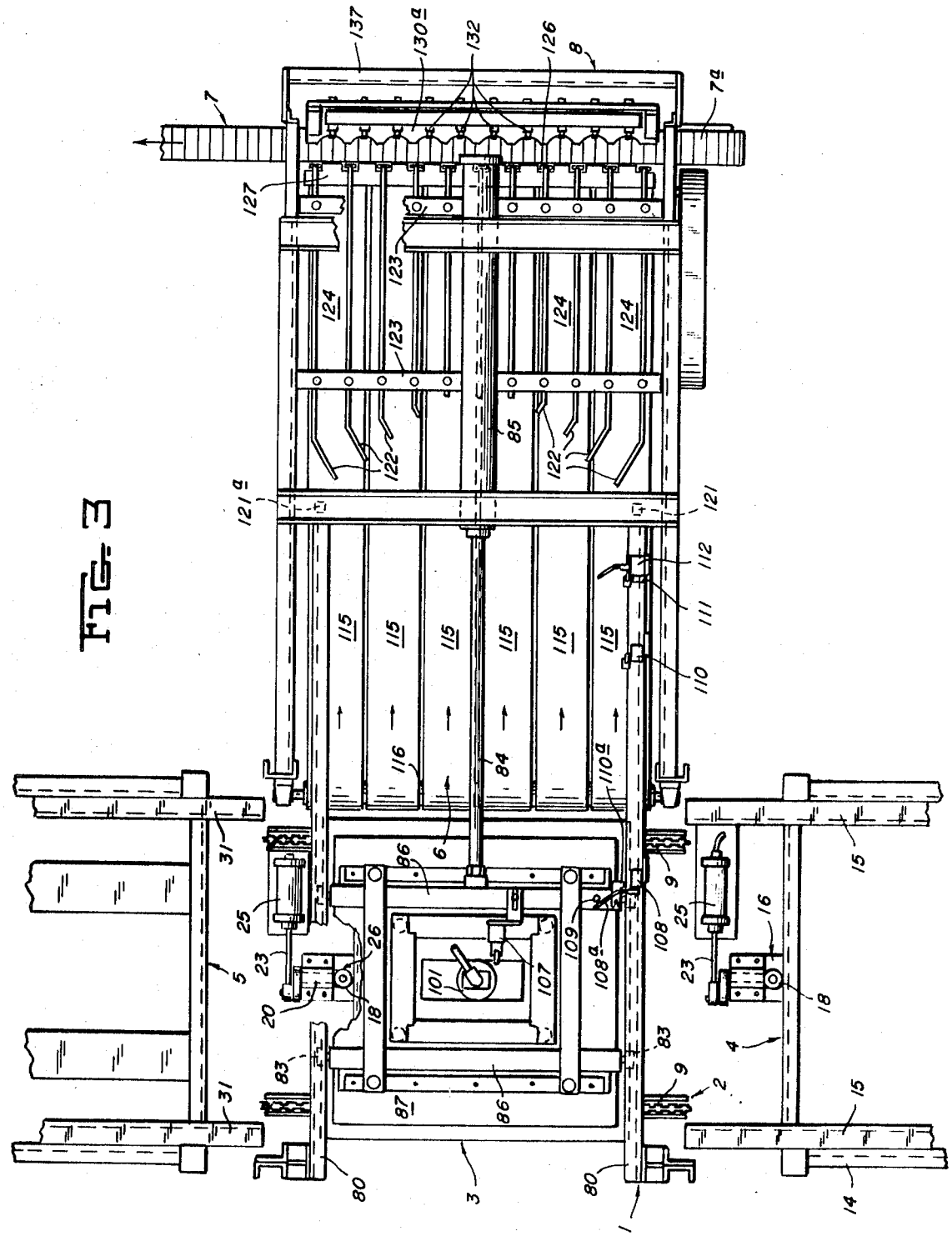
FIG. 3 is a top plan view of the apparatus illustrated in FIG. 2.
Figure 5:
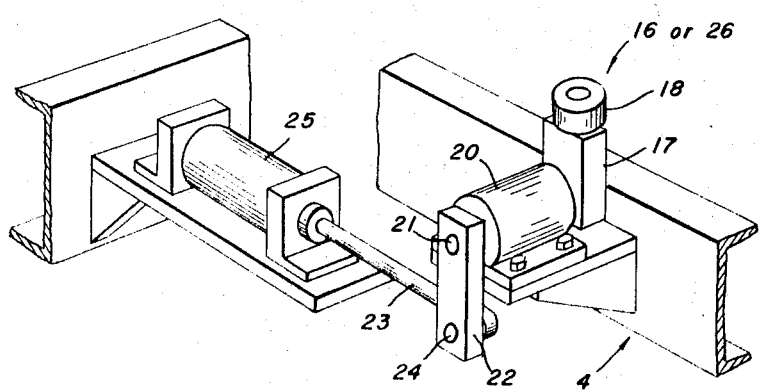
FIG. 5 is a fragmentary perspective view of a stop for restraining a basket in position at one side of the machine until it is to be moved into a position to be unloaded.

The loaded basket-receiving means 4 has a pair of inclined rails 15 carried in a frame 14 and the rails slope toward basket-positioning means at the center of the machine. The loaded basket is generally placed on the receiving means with a fork-lift truck so that the wheels 12 rest on the rails and the basket tends to roll by gravity toward the unloading position. To selectively restrain the basket against premature movement into the unloading position, there is a stop, designated generally as 16, and shown in perspective in FIG. 5. Referring particularly to FIGS. 3 and 5, there is a normally vertically-extending arm 17 with a rubber or other resilient roller 13 at its free upper end, and this normally is in position to engage the forward bottom edge portion of the basket to hold it against movement along the rails 15. The arm 17 is attached to a rotatable shaft 21 in a bearing 20, the shaft extending in a direction parallel to the length of the rails 15. There is an arm 22 at the opposite end of this shaft to which is pivotally attached one end of a piston rod 23, the pivotal attachment being indicated at 24. The piston rod has a piston in a fluid pressure cylinder 25, the arrangement being such that when fluid pressure moves the piston rod to swing arm 22 in the clockwise direction as viewed in FIG. 5, the abutment or stop arm 17 swings down so that the cushion roller 13 is clear of the basket, which may then roll down the track provided by the rails 15.

In the central basket-positioning unit 2 there are parallel conveyor chains 9. As the basket moves down the rails 15, its leading end engages and rests on these chains which are then motor actuated to carry the basket until its leading end contacts a second stop member 26 which is similar to stop 16, when it will be centered under the magnetic head 3. As the basket clears the rails 15, it actuates flag switch 27 that controls the flow of fluid to cylinder 25 to raise the stop so that another loaded basket may be put onto the rails 15 and be ready for transfer to the unloading position.

When the basket under the unloading head has been emptied the chain conveyor 9 is activated which moves the empty basket into contact with a switch 29. Switch 29 provided near the opposite end of the chain conveyor lowers stop 16 as the empty basket leaves the unloading position to allow the placement of a full basket under the head 3. With the conveyor chains 9 operating, the empty basket is moved to the left as viewed in FIG. 1 to the unloading rack 5. That rack has parallel rails 31 carried in a frame similar to rails 15 that incline downwardly away from the unloading position. The arrangement is such that the chains move the empty basket until its wheels are supported on the rails 31, and the basket then rolls clear of the chains, coming to rest against corner stops 32. From this position it may be easily removed by a fork lift truck.

Centered under the magnetic unloading head below the top reaches of the conveyor chains 9 and located between these chains is an elevator 10, which, by pushing up against the movable bottom of the basket, will raise the load to bring the topmost layer of cans against the magnetic head and then slightly lower to leave that layer suspended from the head. The elevator 10 comprises a head plate 40 and a collapsible lazy-tong type of support 41. A hydraulic telescoping cylinder 42 is provided to collapse or extend the support 41 and thus raise or lower the head plate 40 against the bottom panel of the basket.

Figure 2:
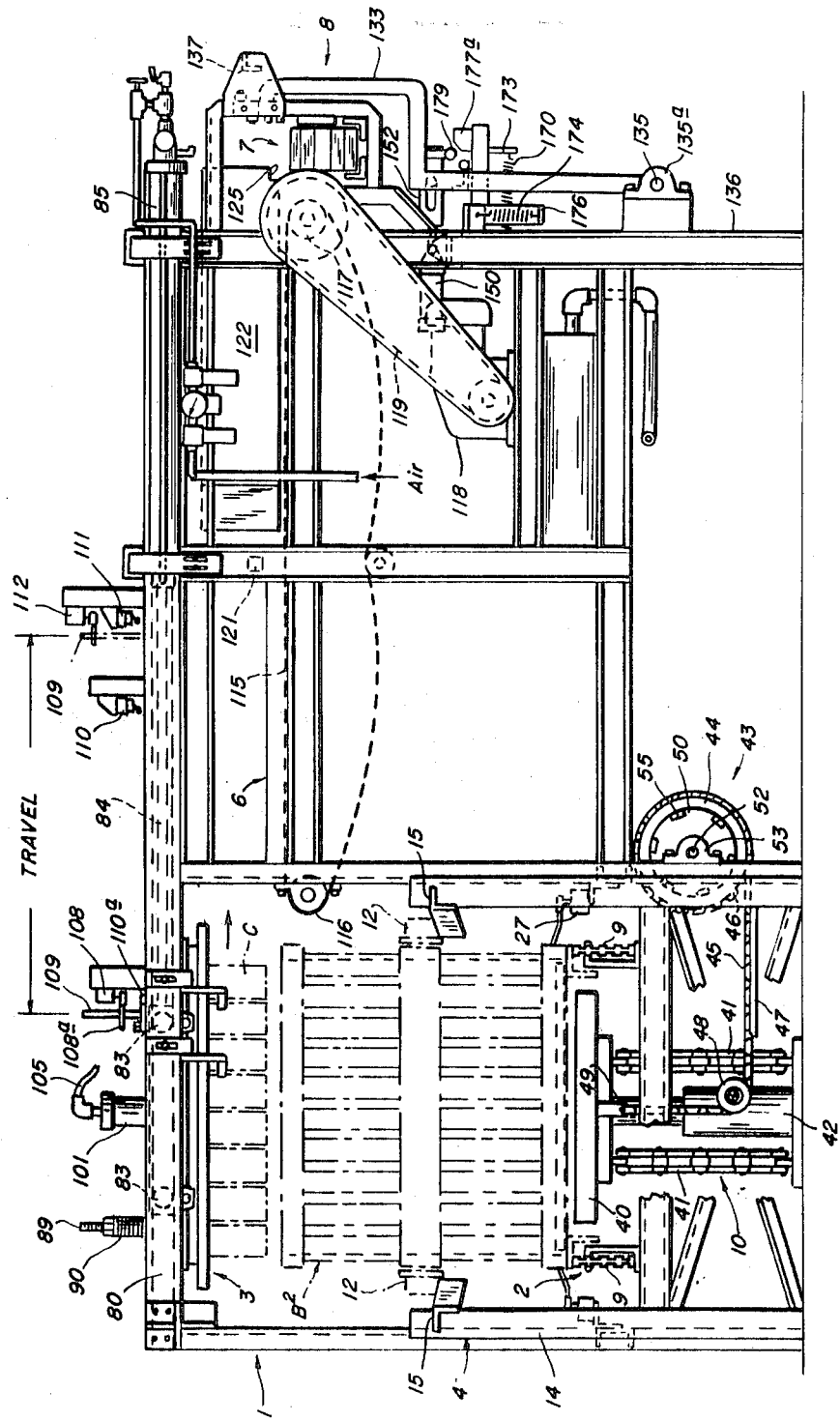
FIG. 2 is a side view of the entire apparatus.

A control means 43 is provided to actuate the chain conveyor 9 and discharge stop member 26 and for effecting the required vertical positioning of the head plate 40 of the elevator 10, and thus the height of the cans therein. Control 43, shown in detail in FIGS. 6, 7 and 8, has a cam wheel 44, and a link belt or chain 45, one end of which is connected by means of connecting pin 46 to the cam wheel 44. The link belt 45 passes along a guide channel 47, around sprocket wheel 48 (see FIG. 2) and is attached at its other end 49 to the head plate 40 of elevator 10. The cam wheel 44 has outer disk 50 and inner disk 51 and is secured to a rotatable shaft 52, shaft 52 being supported by bearings 53 and 54 which are fastened to a portion of the frame 1. The control means 43 can be adapted to regulate the height of any number of layers of cans in the basket, the illustrated embodiment being for use with five such layers. Outer disk 50 is provided with six arcuately-spaced laterally-projecting cams 55 which successively engage a follower 56 fixed on the machine frame. One only of these cams, 55a, has a peripherally-projecting cam element 57 attached thereto for contact with another follower 58 disposed close to but at right angles to follower 56. Follower 56 activates a switching device 59, while follower 58 operates a switching device 60 for the purpose hereinafter described.

Disk 51 also has a cam 61 thereon which contacts two of the followers, follower 62 which energizes switch 63, and follower 64 which energizes switch 65. Shaft 52 also has attached thereto a grooved wheel 66, with one end of a flexible coiled spring 67 attached thereto by fastener 68. The other end of spring 67 is anchored at 69 to the frame. The spring 67 maintains a biasing torque on the shaft 52 to keep the belt 45 taunt and prevent sagging and possible snagging of the belt 45 and to rotate the shaft in a reverse direction when the elevator is lowering. On shaft 52 there is also a disk 70 having an axially-projecting arm 71 affixed to its periphery which activates a switch 72 by contact with a depending leg 73 of the switch 72 that is fixed to the frame of the machine.

The operation of these various cams, followers and switches will hereafter be more fully explained in the description of the operation of the apparatus, but it may be explained briefly that when the elevator is moving up, the chain 45 rotates the wheel 43 against tension of spring 67. As will be hereinafter explained, when the elevator brings the uppermost layer of cans into contact with the magnetic unloading head, the elevator starts to lower. The cams 55 and follower-operated switch 59 stop the lowering after a clearance less than the height of one can develops between the cans suspended from the magnetic head and those in the basket. Follower 58 and switch 60 energize the drive motor for the conveyor chains 9 to effect removal of an empty basket to the unloading rack. Cam 61, follower 62 and switch 63 energize the cylinder to remove the discharge stop member 26 from a blocking position for such transfer. Disk or clamp 70 with arm 71 contacts leg 73 of switch 72 when the shaft with the clamp has been rotated to a predetermined position to latch in a relay that overrides the follower 56 and switch 59 to allow complete lowering of elevator and cam 61, follower 64 with switch 65 de-energizer said latching override relay when the shaft 52 has been rotated in the reverse direction by the descending elevator to the start position to once again render switch 59 effective when the next basket is in position to be unloaded.

The magnetic unloading head comprises a frame which has top cross-frame pieces 86 and side members 86a. On each of the side frame members 86a are rollers 83 engaged in side rails 80 that are supported on the frame 1 to enable the head to be reciprocated back and forth from and into a position over the basket to be unloaded. Such back-and-forth reciprocal travel is effected by piston rod 84 attached to the frame of the magnetic head, and which has a piston (not shown) in cylinder 85 (FIG. 3) that is fixed in the machine frame.

The magnetic head structure comprises a deck plate 87 having structural angle sections secured thereto, and it is suspended near each corner from rigid strips 86b extending transversely to and across strips 86 by bolts 89 that are secured at their lower ends to these angle sections, and which pass up through holes in the ends of strips 86b. There are compression springs 90 around the upper ends of these bolts confined between strips 86b and adjusting nuts 91, the arrangement providing a resilient biasing for the deck plate.

The magnet arrangement itself, which per se is known in the art, includes a grid structure 92 with multiple cells in which are permanent magnet elements 93 which are attached to the deck plate, while there is a stainless steel (nonmagnetic) cover sheet 94 under the grid and attached to it. Bolts 95 with spacing sleeves thereabout are attached to the grid and pass freely through openings in the deck plate. There are four of these bolts 95, two of which are seen in FIGS. 10 and 10a, and the tops of which are shown in FIG. 9, the bolts passing through and depending from angle sections 96.

There are bolts 97 extending upwardly from each end of each angle section 96 around which are cushioning springs 98, the upper ends of these bolts in turn passing through angle bars 99. A supporting plate 100 extends across between bars 99. It has a vertically-positioned fluid pressure cylinder and piston unit 101 thereon, the piston rod of which has its lower end attached to a cross piece 103 supported on parallel angles 104 that are secured to the angle bars 96.

Air or other fluid pressure is conducted to the cylinder piston unit 101 through a flexible hose 105. Completing this assembly, there is a bracket 106 mounted on one of the cross strips 86 (see FIG. 9) that carries a switch 107, the switch having an operating element that will be operated when the magnetic head raises relative to its supporting frame. It will be seen by reference to FIG. 10 that the supporting frame or carriage is confined against upward movement while the deck plate and grid work are permitted limited movement with support pins 31 extending through slots 86a', the pins secured to side frame members 82, while the rollers 83 are confined within the channel-like rails 80.

The arrangement in general is such that when cans are raised by the elevator, the top layer of cans, pressing against cover sheet 94, will raise the deck plate 87 and all parts carried by it. This upward movement activates switch 107, which will reverse the flow of fluid to the elevator cylinder 42, starting to lower the elevator and load of cans. The cans in the top layer will cling to the underside of the magnetic head as illustrated in FIG. 10 wherein, although the magnets 93 will be in contact with cover sheet 94 a small spacing is shown for purposes of clarity. As the elevator lowers, any remaining load and the deck plate with the suspended cans will also lower to its original position. To separate the cans from the head when they are to be unloaded, cylinder 101 will be activated to push down on plate 103, angle bars 96, and bolts 95, to move the grid 92 down, pressing the non-magnetic stainless steel cover plate down away from the magnets a slight distance as indicated in FIG. 10a to break the magnetic field between the magnets and the cans, allowing the cans to drop. When the pressure in cylinder 101 is relieved, springs 98 will return the parts to their normal position. It will be seen therefore that the deck plate with all parts thereon may move vertically relatively to the frame, and the cover sheet 94 and grid 92 may be moved vertically relatively to the deck plate.

By reference to FIG. 9, it will be seen that there is a flag switch 108 on one of the rails 80 with a resilient arm 108a that is contacted by a vertical post 109 on the magnetic head frame or carriage and only when this post has pressed against this arm to close the switch can the elevator operate to raise the head. This prevents operation of the elevator if the magnetic head is not in unloading position over the basket. There is a similar flag switch 110 on the rail 80 near the end of travel of the magnetic head frame, to the right as viewed in FIG. 2, which will reset the elevator controls, so that when switch 108 is next closed the elevator, which in its last operation was lowering the cans and the lowering had stopped, will be operative to again travel upward.

Beyond flag switch 110 there is a switch 111 that is tripped by actuator 110a mounted on the carriage as it has about reached the limit of its rearward travel. This admits an impulse of air to cylinder 101 to effect a release of the suspended cans while flag switch 112 that is reached at the final limit of rearward travel of the magnetic head carriage or frame is next contacted to release the pressure in cylinder 101 and restore the parts to normal position.

The endless can-receiving conveyor means 6 over which the magnetic unloading head carries the cans on its rearward travel, receives the cans when they are released from the magnetic head. It preferably comprises a series of endless narrow belt conveyors 115 in substantially continuous side-by-side relation forming a conveyor unit traveling parallel with respect to the plane of travel of the magnetic unloading head. There is a roller support 116 at the receiving end and a power-driven roller 117 at the discharge end. A motor 118 on the frame drives shaft 117 by a belt 119.

An electronic sensing device, such as a photoelectric elements 121, 121a, is disposed so as to sense when cans traveling on the receiving conveyor 6 have passed a point beyond the traveling range of magnetic unloading head 3. This sensing device prevents the magnetic head from traveling to a position over the receiving conveyor until the area on which the cans are deposited is clear so that if there is an accumulation of cans in the receiving area of the conveyor which would interfere with the deposit of other cans from the magnetic head, the magnetic head is restrained from operation until the area has been cleared. After cans have passed the range of travel of the magnetic head, further cans may be deposited on the receiving conveyor without danger of damage to the cans or danger of accumulated cans prematurely knocking cans off the magnetic head or any misplacement of cans.

Adjacent the discharge end of receiving conveyor 6 there are a number of spaced divider plates 122 which depend from support bars 123 and are spaced above the belt conveyors 115 providing a series of separate lanes 124 in which the cans arrange themselves in single file as they are carried along by the continuously-moving belts 115. Each of the dividers 122 has a notch 125 at its lower end at the discharge end of the conveyor to provide clearance for vertically-movable gate members 126 that extend up through notches in a dead plate 127 over which the cans are pushed by the conveyor (see FIG. 13).

There is an endless cross conveyor means 7 that is wide enough to receive and carry only a single row of cans in the direction of its travel. It has an upper flight 7a that is level with dead plate 127, and which is supported on a longitudinally-extending inverted channel section 127a. The return flight of the cross conveyor is designated 7b.

There is a rocker bar assembly 8 extending along the opposite side of cross conveyor 7 from the ends of the divider plates 122. It comprises a rocker bar 130 with spaced plates 130a, preferably of micarta, thereon above the top conveyor flight 7a but at a level where they will engage cans on this conveyor, with scalloped edges, the rounded recesses of the scallops confronting the several lanes between the divider plates, one recess being centered opposite each lane. micro-switches 132 are positioned on rocker bar 130 with each switch centered above one of the scalloped recesses. These micro-switches 132 are connected in series.

Figure 4:
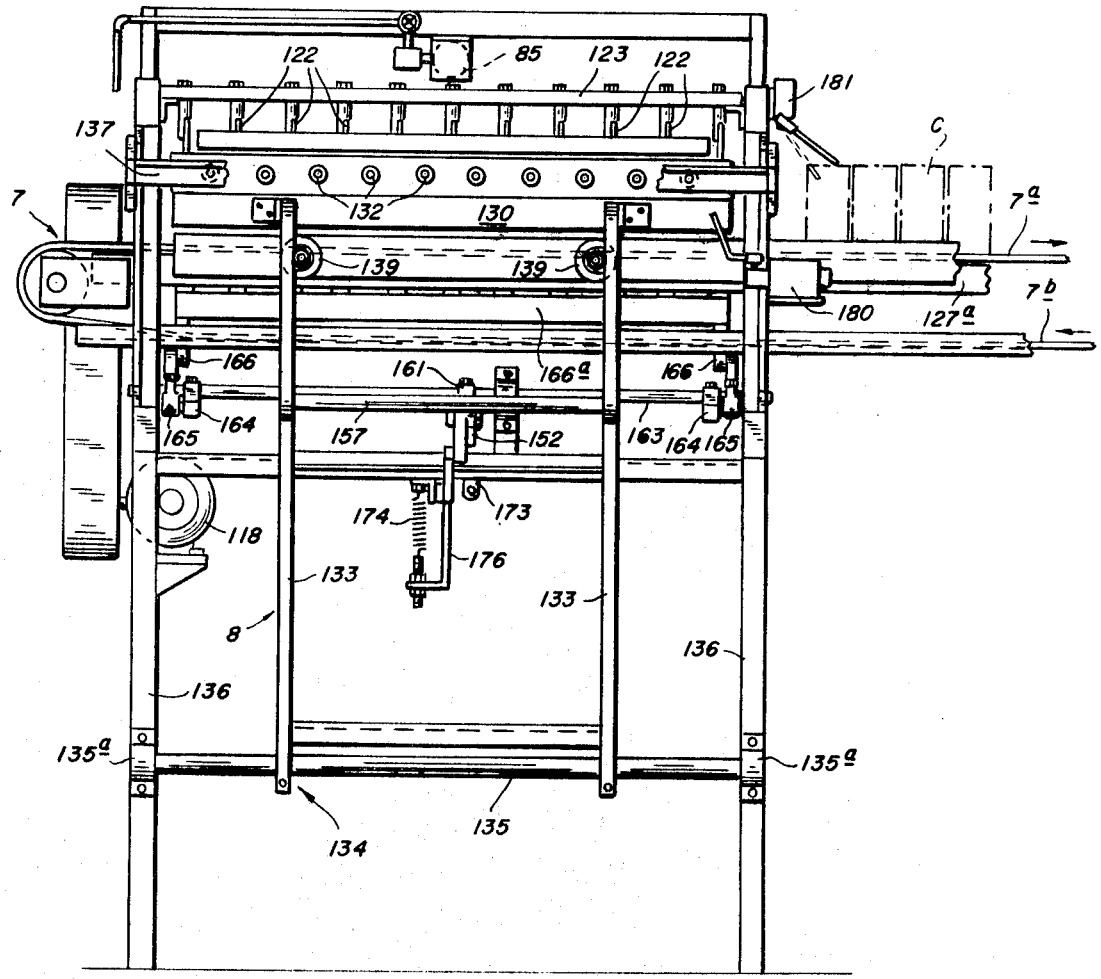
FIG. 4 is a rear view of the apparatus shown in FIG. 2 with parts at the front being omitted.

Rocker bar 130 is attached to depending offset levers 133 which are attached at their lower ends at 134 to a rock shaft 135 mounted on frame member 136. (see FIGS. 2 and 4) A stop bar 137 is connected to the frame member 136 to restrict the rearward motion of rocker bar 130, and rods 138 with bumpers 139 are provided to limit and cushion the forward movement of rocker bar 130 by contact with section 140 of the frame. The rocker arm assembly 8 and the gate members 126 are both operated by means of a cylinder 150. Referring to FIG. 13, a cylinder 150 activated by a fluid pressure source (not shown) has a piston rod 151 and a slide plate 152 is attached to rod 151, the slide plate 152 having a sloped cam surface 153 on its upper edge and a slot 154 therethrough. Slot 154 cooperates with a roller 155 to guide the horizontal reciprocation of slide plate 152. Attached to slide plate 152 adjacent its outer end is a strut 156 which is also connected to a cross bar 157 attached to and extending between the arms 133 of rocker bar assembly 8, so that reciprocating motion of slide plate 152 causes both rocker arm 8 to pivot with rock shaft 135 in bearings 135a and move the rocker bar transversely of its length out of can holding position back to the stop bar 137. Riding on the top of slide plate 152 is a cam follower 160 which is fixed to the outer end of arm 161 and which is clamped at 162 to a cross shaft 163. Near each end of the shaft 163 is a crank 164 with an adjustable link 165 attached to the outer end (FIG. 12). These links each have their upper end pivotally connected to a plate 166 that is supported to swing in a vertical arc at each side of the machine.

An angle bar 166a extends between and is secured to the end plates 166. The gate elements 126 are secured to the vertical flange of this angle. Spring 170 (FIG. 13) is attached at one end by means of a threaded pin 171 to the frame and at its other end by means of a similar threaded pin 172 to a depending lug 173 attached to angle bar 133a that has its ends connected to levers 133. This spring exerts a biasing force on the arms 133 for resiliently holding them in the position shown in FIG. 13 where the rocker bar is moved forward to can holding position and the bumpers 139 contact frame member 140. If the cylinder 150 is fluid pressure operated in one direction only, the spring will also return the piston in the cylinder when the pressure is released.

In addition to the spring 170 for urging the rocker bar into the position shown in FIG. 13, there is a latch arrangement for releasably locking it in that position. It comprises a lever 177 pivoted at 175a to a horizontal angle bar 175 that is fixed on the machine frame. There is a bracket 176 depending from this lever and a spring 174 anchored at its lower end to this bracket, and at its upper end to angle bar 175. This spring urges the lever up to the position shown in FIG. 13 where roller 178 on the lever contacts the horizontal flange of angle bar 133a to restrain the levers 133 and the bar from moving toward the right as viewed in FIG. 13. Lever 177 has an upstanding terminal member 177a with a beveled forward edge. There is a roller 179 carried on and depending from the end of slide plate 152 which strikes this beveled edge when the slide plate is moved to the right to force the terminal 177a down so that the roller 178 rolls under the horizontal flange of bar 133a and the arms 133 can swing to the right to correspondingly move the rocker bar. When the slide plate 152 retracts, the spring 174 raises the latch lever to the latching position.

With the gate elements down, the receiving conveyor moves the leading can in each lane of the dead plate into the hollow of the rocker bar strips 130a where the cans engage switches 132. When each switch has been so closed, the several switches being in series, an electrical circuit is closed that operates an electro-magnetic valve indicated as 150a (FIG. 15) to admit fluid pressure to cylinder 150 to move the slide plate 152 to the right as viewed in FIG. 13, swinging the rocker bar back against stop 137, so that the scalloped edges of bars 130a are clear of the cans and they are then carried in a single file by the continuously-moving cross conveyor to the right as viewed in FIG. 12. As rocker bar 130 moves away from the conveyor 7, the stop bar member 166a is raised so that gate elements 126 block the next can in each lane until the line of cans on the cross conveyor has moved out and the rocker returned to can-restraining position. A switch 180 (see FIG. 11) is mounted on the rear frame and is contacted by the rocker bar 130 when the bar moves away from conveyor 7, this switch preferably being a time switch which will cause the rocker arm assembly 8 to return to rest position only after sufficient time for the single row of cans to be removed from the apparatus by conveyor 7. This switch may activate fluid pressure valve 150a in the reverse direction to move the slide plate 152 to the left as viewed in FIG. 13. A second switch 181 is also provided on the frame, which will prevent the actuating of switch 180 to return the rocker arm assembly 8 to can holding position, while switch 181 is in contact with any cans. This arrangement prevents return of the rocker arm assembly to holding position in the case where cross conveyor 7 is unable to move the row of cans away onto a take-away conveyor (not shown) that carries the cans singly to a labeling machine or other apparatus. This condition may be due to stoppage of the take-away conveyor or accumulation of cans on that conveyor.

While the fluid pressure circuits and electrical circuits are generally conventional and comprise the use of valves or relays and switches common to the industry, FIG. 14 discloses in simple schematic diagram a circuit for the control of the elevator. This control as here shown comprises a four-way valve 200 having an operating lever 201 that is movable from a central "off" position upwardly to admit fluid pressure through supply pipe 202 to pipe 203 into the top of the elevator cylinder 42 while venting fluid through pipe 204 at the bottom of the elevator cylinder to vent pipe 205. There is an electromagnet $M^1$ connected with the operating lever through an armature to move the operating lever 201 upwardly from the "off" position to lower the elevator. There is a second electromagnet $M^2$ having an armature also connected with the lever 201 to move the lever down to raise the elevator. A third electromagnet $M^3$ is connected to the operating lever 201 having a lost motion connection with the lever such that when the magnet $M^1$ raises the lever 201 as shown in this diagram, it raises the armature of $M^3$, but when the electromagnet $M^2$ is energized, it may move the lever 201 down relative to the armature of magnet $M^3$. These electromagnets are controlled through a relay construction of a known type. It may, for example, be a simple stepping relay or a relay of any other type.

Starting with the elevator in the lowermost position, the magnetic head 3 must be in position over the elevator in order to close switch 108 and switch 110 must be closed. To initiate operation, the operator pushes the "on" button of switch 206. This energizes electromagnet $M^2$ through relay R to pull lever 201 down and admit fluid under pressure to the bottom of the cylinder 42 to raise the elevator and vent fluid from the top of the cylinder. When the load on the elevator hits the magnetic head 3, it raises the head slightly and closes switch 107 which, through the relay R, opens the circuit to magnet $M^2$ and closes the circuit to $M^1$ to move the lever 201 into the elevator lowering position. This reverse movement of the elevator reverse the rotation of the cam disk 50 and after the elevator has dropped just a short distance, switch 59 is actuated to energize magnet $M^3$ and bring the lever 201 back to the "off" position, stopping the elevator in its lowering movement. With the downward movement of the elevator stopped, the magnetic head 3 is moved to the unloading position and in so moving it contacts switch 110 near the end of its travel to close switch 110, but the elevator cannot raise until the magnetic head 3 is back in position over the elevator to close switch 108. As soon as switch 108 is closed, the electromagnet $M^2$ will again be energized to raise the elevator, but since a layer of cans has been removed from the top of the load, the elevator must raise another increment higher than it did before, rotating the disk 50 to advance another cam element 55 past the switch 59 and its follower. Since the lever 201 is then in the "down" position when the elevator is raising, the energizing of electromagnet $M^3$ would simply give an idle movement of its armature because of the lost motion connection, but when the disk 50 reverses, due to the raising of the lever 201 and the downward movement of the elevator, switch 59 will be effective on such reverse movement to pull the lever 201 back to the neutral or "off" position. In the diagram $P^1$ and $P^2$ indicate power supply lines. In one of the lines, such as 207, there is a normally closed magnetic switch 208 which is supplied with power through switches 72 and 63. The switch 72 is so located adjacent drum 71 that when the last layer of cans has been raised, the switch 72 will operate switch 208 to open the circuit in the line 207 so that the switch 59 will be ineffective to energize the magnet M³ to stop the downward movement of the elevator or override switch 59, and the elevator will continue to the bottom where cam-operated switch 72 will operate the magnetic switch 208 to close the circuit in line 207 and the apparatus is ready for the unloading of the next basket. When the elevator reaches its lowest position it operates switch 210 and closes a circuit to magnetically open switch 206 so that the elevator will not move up until "on" button of this switch is again pushed. As previously explained, switch 60 is included in the conventional circuit to lower the stop 28 for removal of the empty baskets. For simplification, some of the circuits are shown without relays which would customarily be used, but this has been done for simplification and brevity, as has the omission of the more simple circuitry.

Referring to FIG. 15, which schematically illustrates a circuit for control of the rocker bar and gating mechanism, the power lines are again designated P¹ and P². Line P² is connected in series with the line P¹ through the several microswitches 132 on the rocker bar. When all of these switches are closed, current will flow from line P² through electromagnet M⁴ to open fluid pressure valve 150a to admit fluid pressure from the supply line 211 through pipe 212 to one end of the cylinder 150. When the rocker bar is then moved out of can-holding position and the circuits through all of the microswitches 132 are again opened, a circuit will be closed from line P² through switch 181, provided that all of the cans are clear of the lanes at the discharge end of the delivery belt, and provided that time delay switch 180 has closed, the circuit will then be from line P² through electromagnet M⁵ to reverse the valve 150a and move the piston of cylinder 150 in the opposite direction. Valve 150a is a conventional four-way valve.

In operation, a basket B, filled with cans to be unloaded, is placed by a fork-lift or other transporter on the basket-receiving structure 4, with its rollers 12 riding on tracks 15. The basket rolls down the rails until it contacts stop 16 and is held in position for delivery to the elevator 10. The stop member is moved out of blocking condition and conveyor chains 9, which are activated by the operator, bring the basket into position below magnetic unloading head 3 and centered above head plate 40 of elevator 10. The elevator is raised by operation of cylinder 42 and the lazy-tong support so that the cans are raised with the top layer substantially clear of the basket and into contact with the magnetic head, slightly lifting the head to operate switch 107 that reverses the elevator which then starts to lower. The top layer of cans is magnetically suspended from the head as the rest of the load lowers. The elevator lowers slightly until further downward travel is restricted through switch 56 and the cam elements 55 on disk 50 of control means 43. When the elevator is moving up and the cam wheel is being rotated, the operation of these cam switches does not affect the operation, and it is only when the elevator starts down and the cam element 55 that has last passed switch 56 again engages the switch that the operation of the switch 56 will stop the elevator. The cams 55 are therefore positioned on disk 50 so that at any level there will first be an overtravel of the cam element to last engage the switch before the switch is effective on the reverse rotation. The magnetic unloading head is then moved horizontally either automatically or by manual operation of a push button by actuating piston 85 until the unloading head is over the receiving conveyor 6. Then the cylinder 101 is actuated to separate cover plate 94 from magnet assembly 93, breaking the magnetic field and depositing the entire layer of cans as a group on the receiving conveyor 6 which carries them away from under the magnetic unloading head toward the discharge end of the conveyor, the head being returned to a position overlying elevator 10. The sequence of raising the elevator 10, magnetically affixing cans to the magnetic unloading head and depositing them on conveyor 6 is repeated until all of the layers are removed. If, however, there is an accumulation of cans on the conveyor 6 that would interfere with more cans being placed on the conveyor, the reciprocation of the head will be restrained by sensing means such as the electric eye arrangement 121—121a previously described. When the last layer of cans has been unloaded, the elevator is again raised and shaft 52 of control 43 will have been rotated so that switch 72–73 is activated, overriding follower switch 56 for complete lowering of the elevator 10, and upon such complete lowering, switch 64–65 drops out the relay to again energize switch 55, while switch 58–60 activates the basket conveyor chain 9, and switch 62–63 effects lowering of the discharge stop member 26 and the empty basket is removed and deposited on rails 31 of discharge rack 5, for subsequent removal therefrom. The empty basket on removal from chain 9 closes a switch 29 to lower stop 16 to bring another basket into unloading position.

Upon deposition of the cans to conveyor 6, the cans are carried thereby and fed into lanes 124 to form a single transverse row of cans on the top reach 7a of the continuously-operating cross conveyor 7, the cans being held against movement by being confined by the rounded recesses of the scalloped rocker bar 130. When each recess has received the lead can from all of the lanes and all switches 132 are activated, the gate members 126 are raised, preventing further feeding of cans to the cross conveyor 7, while the rocker arm assembly is moved transversely of its length clear of the cans to permit their travel with transverse conveyor 7 away from the apparatus. When all cans of a transverse row are carried to one side of the apparatus, the rocker arm assembly 8 is returned to can-restraining position. Gate members 126 are lowered so that another single row of cans are lined up on the conveyor 7, the cycle repeating as long as cans are present in all lanes.

The invention has been described specifically in connection with unloading of hot sterilized cans from baskets but is applicable for use with other magnetic stacked articles of uniform size in baskets or receptacles having bottom panels that can move upwardly inside the receptacle, or which are stacked in layers on pallets or other supporting panels. The operator of the machine has only to follow the operation of the machine and monitor it for malfunction and to push buttons, and where there are separator sheets between layers of cans, to remove these in succession as the uppermost layer is removed.

The elevator itself in combination with the switch 107 on the magnetic head controls the upward movement in increments of the load while the control 43 assures limited downward travel after each increment of upward movement, thereby providing a complete indexing system for the operation. Since the cam elements 55 and switch 56-59 operate a valve to stop the lowering of the elevator, that valve or its operation may also control the movement of the magnetic head from a position over the elevator to a position over the belt, either by fluid pressure circuits or electric circuits. The machine as described has in effect a dual gating arrangement in that the elements 126 control the discharge of cans from the receiving conveyor and the scalloped rocker bar controls their removal by cross conveyor 7. These gating means operate in unison from the single piston and cylinder 150, but reversely to each other so that when one releases the travel of the cans, the other blocks the travel of other cans.

Should it ever be desirable or necessary to do so, the cylinder 150 could be operated by a manually operated valve (not shown) in which case the switches 132 could flash a signal to inform the operator when a row of cans had been completed, or the switches could be removed or rendered inactive to enable manual operation in the event there would be a plurality of cans, but for some reason, there might not be cans in all of the lanes.

We claim:
1. Apparatus for separating a group of cans or the like into a single line comprising:
   a. a can-receiving conveyor having a receiving end on which groups of cans are placed and a discharge end towards which the conveyor carries the cans, b. divider means for arranging the cans into a plurality of parallel lanes at the discharge end, c. a cross-conveyor at the discharge end of the receiving conveyor of a width to receive only a single can from each lane at a time, d. gating means at the discharge end of each lane movable into and out of can-obstructing position, other means alongside the cross-conveyor confronting the ends of the lanes movable between a holding position where it will provide only sufficient clearance for a single can to be discharged at a time from each lane and retaining them in such position until a single row of cans has been positioned on the cross-conveyor to a position where it clears the row of cans on the cross-conveyor whereby they may be carried away by the cross-conveyor, and e. operating means for moving said gating means into can-obstructing position when said other means is clear of said row of cans and moving said gating means out of can-obstructing position when said other means returns to its holding position.

2. Apparatus as defined in claim 1 wherein said operating means comprises a common fluid pressure cylinder and linkage for effecting such opposition motions to the gating means and said other means.

3. Apparatus as defined in claim 1 wherein said other means comprises a bar parallel with the cross-conveyor and located above it at a distance to engage cans on the cross-conveyor, said bar having a scalloped can-engaging end with the hallows of the scallops being centered opposite the lanes so that when a can leaves a lane it is received in a hollow, said bar being movable transversely of its length into and out of can-holding position.

4. Apparatus as defined in claim 3 wherein there is an electric switch on the bar above each hollow positioned to be operated when a can enters the hollow above which it is positioned.

5. Apparatus as defined in claim 3 wherein there is an electric switch on the bar above each hollow positioned to be operated when a can enters the hollow above which it is positioned, the switches being connected in series, and the operating means being effective only when all switches are closed.

6. Apparatus as defined in claim 1 in which both conveyors comprise continuously-moving belts.

7. Apparatus as defined in claim 1 wherein said conveyors are both continuously-driven endless belt conveyors, and there is a means for intermittently depositing a group of cans on the can-receiving end of the receiving conveyor.

8. Apparatus as defined in claim 7 wherein there is means for rendering said last-named means inoperative if cans accumulate on the receiving end of the receiving conveyor before they can enter said lanes for transfer to the cross-conveyor.

9. Apparatus as defined in claim 7 in which said can-depositing means comprises a horizontally-reciprocable magnetic head movable between a position over the receiving end of the receiving conveyor to a position above a stack of cans arranged in horizontal layers, and means arranged to move said stack intermittently into contact with said magnetic head and to then lower the stack whereby the uppermost layer is suspended from the magnetic head, means for effecting horizontal movement of the magnetic unloading head between said two positions, and means for effecting release of the suspended cans as a group when said magnetic head is positioned over the receiving end of the receiving conveyor.

10. Apparatus as defined in claim 7 wherein said means for depositing groups of cans on the receiving end comprises means arranged to successively remove layers of cans from a stack of cans in horizontal layers, one layer at a time, each layer comprising a group.

11. A container transfer apparatus for the transfer of containers from a receptacle holding stacked layeres of containers to a single file formation on a conveyor, comprising:

a. a reciprocating magnetic head, b. means for supporting a receptacle holding a load of stacked layers of containers in an unloading position beneath said magnetic head, c. means for providing relative vertical movement between said load of containers and said magnetic head whereby the top layer of the stack of containers contacts and is magnetically held as a group to the underside of the magnetic head, d. means for moving the magnetic head from a position over said unloading position horizontally to a discharge position, e. a receiving conveyor means having a receiving end, located under the magnetic head when it has moved into discharging position, on which said head may deposit containers, the receiving conveyor having a discharge end toward which it carries said deposited containers, f. divider means adjacent the discharge end of said receiving conveyor for arranging the containers in parallel lanes at the discharge end, g. a cross-conveyor at the discharge end of said receiving conveyor onto which containers may singly move in succession from each lane, h. restraining means arranged along the cross-conveyor for limiting the movement of more than a single container from each lane at a time and holding all containers in position on the cross-conveyor until a container has moved onto the cross conveyor from each lane, i. means for releasing all of the containers for movement with the cross-conveyor when one container has been received thereon from each lane, and j. retractable gate means for preventing movement of containers from said lanes onto said cross-conveyor when said restraining means has released the row of containers for movement with the cross conveyor.

12. A container apparatus as defined in claim 11 having means for preventing the retraction of said gate means until the row of containers positioned on said cross-conveyor has been moved by the cross conveyor clear of said lanes.

13. A container transfer apparatus as defined in claim 11 wherein there is a loaded receptacle receiving structure adjacent said means for supporting a load of containers in position under said magnetic head, said receiving structure when an inclined trackway arranged for gravity transfer of receptacles therealong and an empty receptacle discharge structure, adjacent said means for supporting a load of containers under said magnetic head, having an inclined trackway along which empty receptacles when transferred thereto will move by gravity away from said position, and selectively operable means arranged to receive and position a loaded receptacle from said receiving structure under said magnetic head and transfer an empty receptacle to the trackway of the discharge structure.

14. A container transfer apparatus as described in claim 13 wherein said selectively operable means comprises power driven conveyor chains.

15. A container transfer apparatus as defined in claim 14 wherein there is a stop member selectively movable into and out of blocking position arranged to hold a receptacle on said receiving structure against gravity transfer onto said chain conveyors until it is moved out of blocking position.

16. A container transfer apparatus as defined in claim 15 wherein there is a second stop member selectively movable into and out of blocking position to hold a receptacle against movement onto said discharge structure and under the elevator until it is moved out of blocking position.

17. A container transfer apparatus as defined in claim 14 wherein there are two spaced conveyor chains and wherein an elevator is positioned intermediate said two chains, above which a loaded receptacle is moved by said chains, and beneath said magnetic head, for effective relative vertical movement of said load of containers and said magnetic head.

18. A container transfer apparatus as defined in claim 17 wherein control means is provided for intermittently raising said load of containers and contact the uppermost layer thereof with said magnetic head, whereby said uppermost layer is magnetically adhered to said magnetic head and lowering said load of containers a distance sufficient to permit moving of said magnetic head horizontally from a position over said unloading position to a discharge position above said receiving conveyor means.

19. A container transfer apparatus as defined in claim 18 having means adjacent said receiving conveyor to prevent movement of said magnetic head from said unloading position when containers are present on said receiving conveyor within the range of travel of said reciprocating magnetic head.

20. A container transfer apparatus as defined in claim 19 wherein said restraining means arranged along said cross-conveyor comprises a bar movable transversely of said cross-conveyor, said bar having a scalloped can-engaging end with the hollow of the scallops centered opposite each lane at the discharge end of the receiving conveyor for engagement of a single can from each said lane and switch means adjacent each hollow, the switches connected in series, and the bar being movable into and out of can-engaging position.

21. A container transfer apparatus as defined in claim 20 wherein said switches comprise micro-switches connected in series and activated by contact with said containers.

* * * * *